Sept. 1, 1959   O. MEIER   2,902,147
MANDREL ADJUSTING DEVICE FOR TUBE EXTRUSION PRESS
Filed Aug. 9, 1956   2 Sheets-Sheet 1

INVENTOR.
OSKAR MEIER
BY

Sept. 1, 1959     O. MEIER     2,902,147
MANDREL ADJUSTING DEVICE FOR TUBE EXTRUSION PRESS
Filed Aug. 9, 1956     2 Sheets-Sheet 2
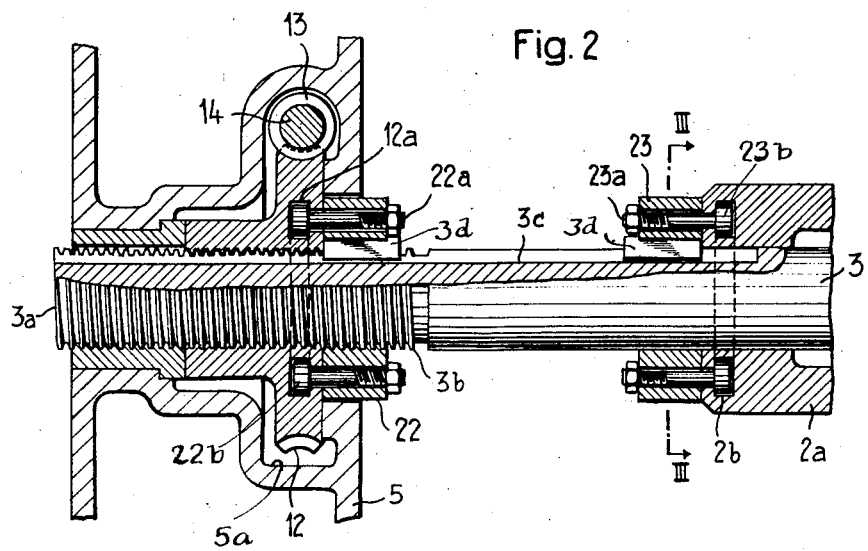
Fig. 2
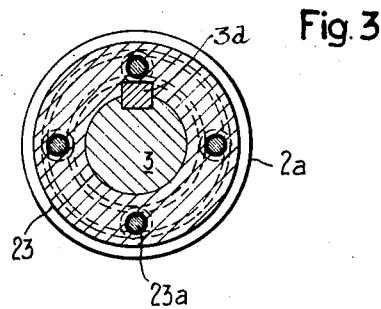
Fig. 3
INVENTOR.
OSKAR MEIER

2,902,147

MANDREL ADJUSTING DEVICE FOR TUBE EXTRUSION PRESS

Oskar Meier, Balsthal, Switzerland, assignor to Gesellschaft der Ludw. von Roll'schen Eisenwerke A.G., Gerlafingen, Switzerland, a Swiss company Application August 9, 1956, Serial No. 603,145

Claims priority, application Switzerland August 10, 1955

2 Claims. (Cl. 207—3)

The present invention relates to a mandrel adjusting device for tube and extrusion presses, in particular for the manufacture of polygonal sections.

The mandrel of such a press must be axially adjustable to the press plunger and to the die respectively. With many polygonal sections it is furthermore necessary for the mandrel to be rotatable around its longitudinal axis so that its section can be accurately adjusted to the section of the press die. So far, worm or tooth gears actuated manually or by means of an electric motor have been employed for axial adjustment of the mandrel. Rotation of the mandrel around its axis has been effected by primitive means. It has also been proposed to arrange the die so as to be rotatable around its axis. Such a design, however, presents difficulties owing to the lack of available space at the press outlet and could not be adopted so far.

It is therefore the aim of the present invention to do away with the aforesaid and other deficiencies heretofore encountered in rotatably as well as axially adjusting the mandrel of a tube press or other extrusion press.

It is another object of the present invention to provide means affording selectively an axial displacement of a press mandrel while retaining it non-rotatable, or optionally, a rotational displacement of the press mandrel while retaining it axially fixed.

These and other objects of the invention will become further apparent from the following detailed description.

One of the features of the present invention is a mandrel adjusting device by means of which one drive rotates the mandrel around its axis as well as displaces it axially to the press plunger in which it is supported. The invention is further characterized by the fact that the mobile press yoke is equipped with a housing having a worm and worm wheel incorporated in it through which the rear end of the mandrel bar extends, the worm wheel being axially fixed in the housing and screwed, by means of a thread, to the rear end of the mandrel bar, and that the mandrel bar is provided with two coupling discs which are axially displaceable but not rotatable and of which one can be rigidly connected with the worm wheel and the other with the press plunger.

In the drawings:

Fig. 2 is an enlarged sectional view of a portion of the mandrel adjusting mechanism of Fig. 1.

Fig. 3 is a transverse section taken along line III—III of Fig. 2.

Figure 1:
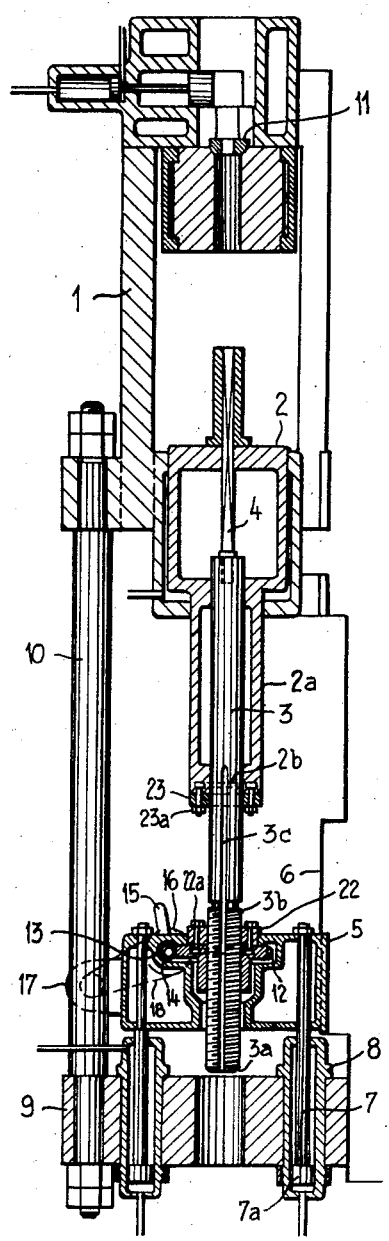
Fig. 1 is a longitudinal section of a tube and extrusion press incorporating a mandrel adjusting device according to the invention.

An embodiment of the invention is shown in the attached drawings which illustrate a tube extrusion press having a mandrel adjusting device incorporated in longitudinal section.

In the principal cylinder 1 of a tube extrusion press is a press plunger 2 with a plunger extension 2a. In the press plunger 2 is arranged a mandrel bar 3 into which the mandrel 4 is threaded on the stamp side. The opposite end 3a of the mandrel bar 3 extends through the mobile press yoke 5 which is displaceably arranged on the base plate 6. This yoke 5 is connected with the piston rods 7 of the hydraulic press cylinders 8 and is axially displaced in both directions of travel by pistons 7a. The press cylinders 8 are incorporated in the fixed press yoke 9 which is rigidly connected with the base plate 6 and attached to the main cylinder 1 by means of tie rods 10 as by screwing. The press cylinders 8 can be arranged horizontally or at an angle to the horizontal plane.

In order to rotate the mandrel rod 3 and its mandrel 4 around its axis and to adjust it to the die 11, and to displace the mandrel bar 3 axially in the press plunger 2, the said bar is provided with a thread 3b at its portion 3a which extends into the press yoke 5. On this thread is arranged the worm wheel 12 which is designed as a nut and which is rotatable in the housing 5a formed in movable press yoke 5 while being axially fixed. The worm wheel 12 is engaged by worm 13 which is arranged on shaft 14. Outside the displaceable press yoke 5 is the crank 15 on the shaft 14, and a V-belt pulley 16. The motor 17 is arranged on the mobile press yoke 5 and can drive the shaft 14 via V-belt 18. Mandrel bar 3 is further equipped with respective keyways 3c which engage two coupling discs 22, 23 displaceably arranged on mandrel bar 3 rigidly connected with the latter by means of keys 3d. The worm wheel 12 is provided with a T-type annular groove 12a which is engaged by the heads 22b of the screws 22a so that the worm wheel 12 can be connected or clamped rigidly with the first coupling disc 22 and with the mandrel bar 3. When the screws 22a are loosened, their heads 22b move freely in the keyway 12a. The end of the plunger extension 2a remote from the press tool is also equipped with a keyway 2b having T-type cross sections so that the second coupling disc 23 and the mandrel bar 3 can be connected or clamped with the press plunger 2 so as to be unrotational but axially displaceable.

The operation is as follows: If the mandrel bar 3 is to be rotated on its axis, the screws 23a of the second coupling 23 are loosened so that the heads 23b of the screws 23a can be displaced in the keyway 2b. The screws 22a are then tightened so that the first coupling disc 22 is firmly connected with the worm gear 12. By turning the crank 15 or starting motor 17 the worm gear 12 is rotated which coupled with the mandrel bar, will rotate the latter relative to the press plunger 2 and thus circumferentially in relation to the die 11. If the mandrel bar is to be axially displaced in the press plunger 2, the screws 22a are loosened and the screws 23a tightened. The worm gear 12 will then turn on the mandrel bar thread 3b and displace the mandrel bar 3 axially in the plunger 2 while the mobile press yoke 5 stays in place. When pressing, the coupling disc 23 is tightened so that axial adjustment is possible during the pressing operation.

Having now particularly described and ascertained the nature of my said invention and in what manner the same is to be performed, I declare that what I claim is:

1. In a press for forming extrusions in the form of tubes, profiles and like products, which press has a press cylinder and a press plunger longitudinally movable in said press cylinder and relative to a die located ahead of said plunger; mandrel adjusting means comprising a mandrel bar adapted to be axially displaceable in said press plunger and having a threaded portion at one end thereof, means located on said bar for connecting a mandrel thereto, a press yoke, a drivable worm rotatably journalled in said yoke, the latter forming a housing for said worm, a worm wheel meshing with said worm and provided with a centrally located threaded bore, said threaded end portion of said mandrel bar extending through said worm wheel and engaging the threads of said bore, engageable and disengageable first coupling means adjacent said worm wheel and adapted when engaged to prevent relative rotation between said mandrel bar and said worm wheel, and engageable and disengageable second coupling means adjacent said press plunger and adapted when engaged to prevent relative rotation between said mandrel bar and said press plunger, whereby upon disengagement of said second coupling means and engagement of said first coupling means said mandrel bar and said mandrel when connected thereto may be rotated relative to said press plunger and thus circumferentially relative to said die, and whereby upon disengagement of said first coupling means and engagement of said second coupling means said mandrel bar and said mandrel may be axially displaced relative to said press plunger to thereby effectuate adjustment of said mandrel toward and away from said die.

2. In a press for forming extrusions in the form of tubes, profiles and like products, which press has a press cylinder and a press plunger longitudinally movable in said press cylinder and relative to a die located ahead of said plunger; mandrel adjusting means comprising a mandrel bar adapted to be axially displaceable in said press plunger and having a threaded portion at one end thereof, said mandrel bar being provided with longitudinally extending keyway means, means located on said bar for connecting a mandrel thereto, a press yoke movable with respect to said cylinder, a worm rotatably journalled in said yoke, the latter forming a housing for said worm, a worm wheel meshing with said worm and provided with a centrally located threaded bore, said threaded end portion of said mandrel bar extending through said worm wheel and engaging the threads of said bore, drive means located exteriorly of said housing and operatively connected with said worm, respective first and second disc means slidably seated on said mandrel bar for rotation therewith, respective first and second clamping means including headed bolts, said first clamping means being carried by said first disc means and adapted to interconnect said worm wheel with said first disc means, said second clamping means being carried by said second disc means and adapted to interconnect said second disc means with said press plunger, key means carried by said first and second disc means respectively to engage said keyway means so as to prevent relative rotation between said mandrel bar and said first and second disc means, respectively, said worm wheel and said press plunger each being provided with an annular groove adapted to engage the heads of said headed bolts of said first and second clamping means.

References Cited in the file of this patent

UNITED STATES PATENTS

| 79,549 | Chubbuck et al. | July 7, 1868 |
| 399,291 | Siemens | Mar. 12, 1889 |
| 2,732,066 | Albers | Jan. 24, 1956 |
| 2,738,063 | Billen | Mar. 13, 1956 |

FOREIGN PATENTS

| 17,014 | Great Britain | Oct. 14, 1893 |
| 737,591 | Great Britain | Sept. 28, 1955 |